United States Patent [19]

Meston

[11] Patent Number: 4,933,118

[45] Date of Patent: Jun. 12, 1990

[54] GAS SCRUBBING APPARATUS

[76] Inventor: Kelly Meston, 133 Woodburn Crescent, Okotoks, Alberta, Canada, T0L 1T0

[21] Appl. No.: 286,709

[22] Filed: Dec. 20, 1988

[51] Int. Cl.⁵ ............................................. B01F 3/04
[52] U.S. Cl. ..................................... 261/123; 55/461
[58] Field of Search ........................... 261/123; 55/461

[56] References Cited

U.S. PATENT DOCUMENTS

| | | | |
|---|---|---|---|
| 157,781 | 12/1874 | Bean | 261/123 |
| 474,838 | 5/1892 | Lambert | 261/123 |
| 1,045,590 | 11/1912 | Mueller | 261/123 |
| 2,099,802 | 11/1937 | Ewig | 261/123 |
| 2,998,714 | 9/1961 | Bonzer | 261/DIG. 4 |
| 3,414,248 | 12/1968 | Iwanaga et al. | 261/123 |
| 3,642,259 | 2/1972 | Bowden | 261/123 |
| 3,757,367 | 9/1973 | Campbell | 55/461 |
| 3,920,552 | 11/1975 | Elkern | 261/123 |
| 4,023,528 | 5/1977 | Applegate | 261/123 |
| 4,060,574 | 11/1977 | Verner et al. | 261/123 |

FOREIGN PATENT DOCUMENTS

| | | | |
|---|---|---|---|
| 10836 | 6/1892 | United Kingdom | 261/123 |
| 576851 | 4/1946 | United Kingdom | 261/123 |

Primary Examiner—Tim Miles
Attorney, Agent, or Firm—Shlesinger & Myers

[57] ABSTRACT

The conventional gas scrubbing apparatus includes a tower through which liquid or scrubbing fluid flows in one direction and gas in the opposite direction for contact with the scrubbing fluid. A relatively simple, portable structure includes a casing with a vertical inlet duct in one end thereof for introducing a gas into the bottom of a treatment liquid in the casing; a first inclined baffle extending between the sides of the casing from such one to proximate the other end thereof; a second inclined baffle extending between the sides of the casing from the other end thereof to proximate such one end, the baffles defining a circuitous path for the gas to ensure maximum contact between the gas and the treatment fluid and at least one outlet for the gas in the top of the casing.

11 Claims, 8 Drawing Sheets

GAS SCRUBBING APPARATUS

BACKGROUND OF THE INVENTION

This invention relates to a gas scrubbing apparatus and in particular to a portable hydrogen sulfide gas scrubbing apparatus for use on tank trucks and storage tanks.

In general, gas scrubbing apparatuses are bulky, permanent structures including a tower containing baffles for countercurrent contact between a gas to be cleaned and a treatment liquid. Obviously, such structures are not portable, and cannot readily be miniaturized to render them portable. Moreover, the structures are not suitable for small scale operations.

A need exists for a small gas treatment apparatus of the type which can be mounted on a tank truck or other vehicle for treating cases emanating from liquid carried by the vehicle. Such an apparatus should, inter alia, have relatively small dimensions, be resistant to vibration, i.e. capable of operating while in motion, and be easy to empty and fill with scrubbing liquid. The object of the present invention is to meet the above need by providing a relatively simple gas scrubbing apparatus, which can readily be produced with small dimensions.

BRIEF SUMMARY OF THE INVENTION

Accordingly, the present invention relates to a portable gas scrubbing apparatus comprising oblong casing means for containing a treatment fluid; inlet duct means in one end of said casing means for introducing gas into the bottom of said one end of said casing means; first inclined baffle means extending between the sides of said casing means from said one end of the casing means to proximate the other end of said casing means; second inclined baffle means above said first inclined baffle means extending between the sides of said casing means from said other end of said casing means to proximate said one and of the casing means, whereby, when said casing means is filled with treatment fluid to surround said baffle means, the baffles define a circuitous path for gas introduced through said inlet means into the treatment fluid beneath said first baffle means at one end of the casing means to the top surface of the fluid, thereby ensuring good contact between the gas and the treatment fluid; and outlet duct means in the top of said casing means for discharging treated gas from the casing means.

BRIEF DESCRIPTION OF THE DRAWINGS

The invention will be described in greater detail with reference to the accompanying drawings, which illustrate preferred embodiments of the invention, and wherein.

Figure 1:
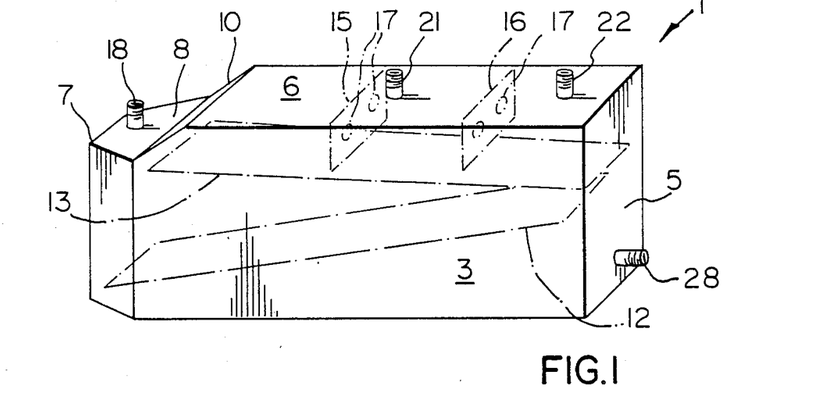
FIG. 1 is a perspective view from above and one end of a gas scrubbing apparatus in accordance with the present invention.
Figure 2:
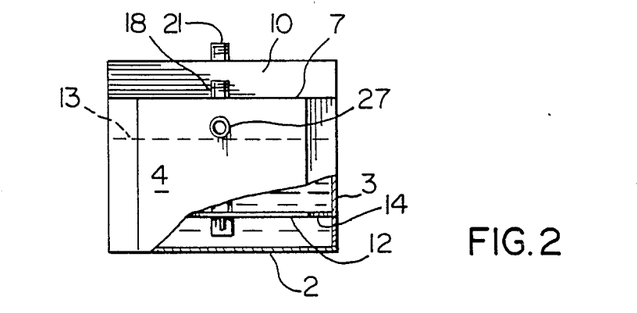
FIG. 2 is a partly sectioned, end view of the apparatus of FIG. 1.
Figure 3:
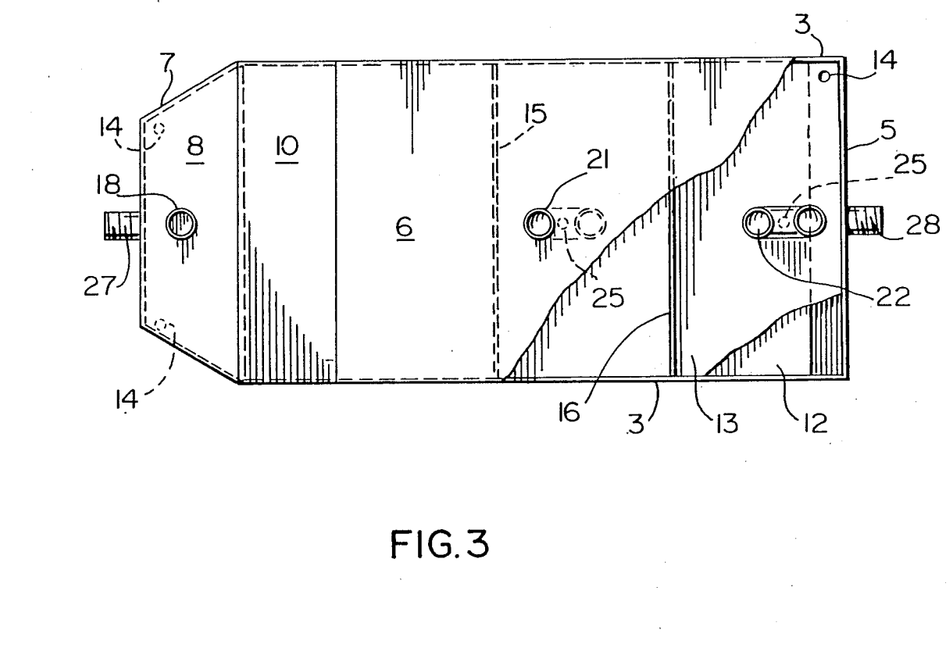
FIG. 3 is a partly sectioned, planar view of the apparatus of FIGS. 1 and 2.

Referring to FIGS. 1 to 3, one embodiment of the apparatus of the present invention includes a casing generally indicated at 1. The casing 1 is defined by a bottom wall 2, side walls 3, end walls 4 and 5, and a top wall 6. One end 7 is lower than the remainder of the top wall 6 and is connected thereto by an inclined shoulder 10.

The casing contains a pair of elongated, inclined plates or baffles 12 and 13. The lower baffle 12, which has a tapered end 14 similar to the tapered end 7 of the casing extends from one end wall 4 upwardly towards the other end wall 5, stopping short of the latter. The other, upper baffle 13, is inclined in the opposite direction, extending from the end wall 5 to the beginning of the tapered end 7 of the casing 1. Small drain holes 14 are provided near the ends of each baffle 12 and 13. A pair of vertical baffles 15 and 16 are provided in the top of the casing 1. The baffles 15 and 16 are defined by transversely extending rectangular plates, which abut the top wall 6.

Figure 5:
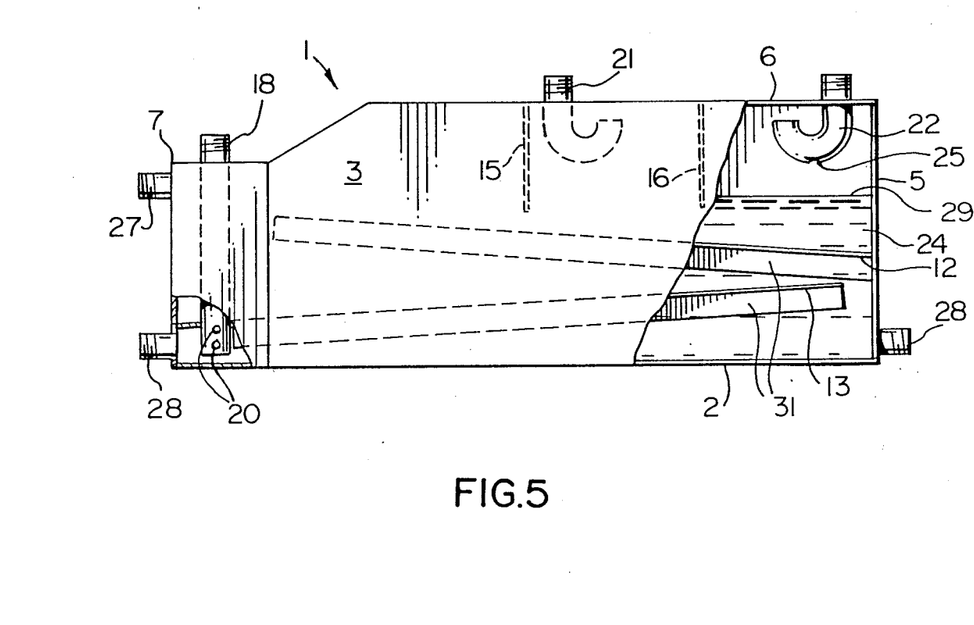
FIG. 5 is a partly sectioned, side elevational view of a third embodiment of the apparatus of the present invention.

Gas is introduced into the tapered end 7 of the casing top wall 8, and the baffle 12 to a short distance from the bottom wall 2. As shown in FIG. 5, the inlet pipe 18 can include small gas discharge openings 20 in each side wall thereof a short distance above the open bottom end of the pipe. A pair of J-shaped vent pipes 21 and 22 are provided in the top wall 6 of the casing 1 extending downwardly between the baffles 15 and 16, and between the baffle 16 and the end wall 5 of the casing 1, respectively.

At least one of the vent pipes 21 and 22 is used to introduce a treatment liquid 24 or scrubbing agent into the casing 1. A drain opening 25 is provided in the bottom of each vent pipe 21 and 22. An overflow outlet pipe 27 is provided in the top of the narrow end wall 4, and drain pipes 28 are provided in the bottom of each of the end walls 4 and 5. In this embodiment, the casing 1 is filled with liquid to a level 29 overlapping the bottom ends of the baffles 15 and 16, and below the bottom ends of the vent pipes 21 and 22.

Figure 4:
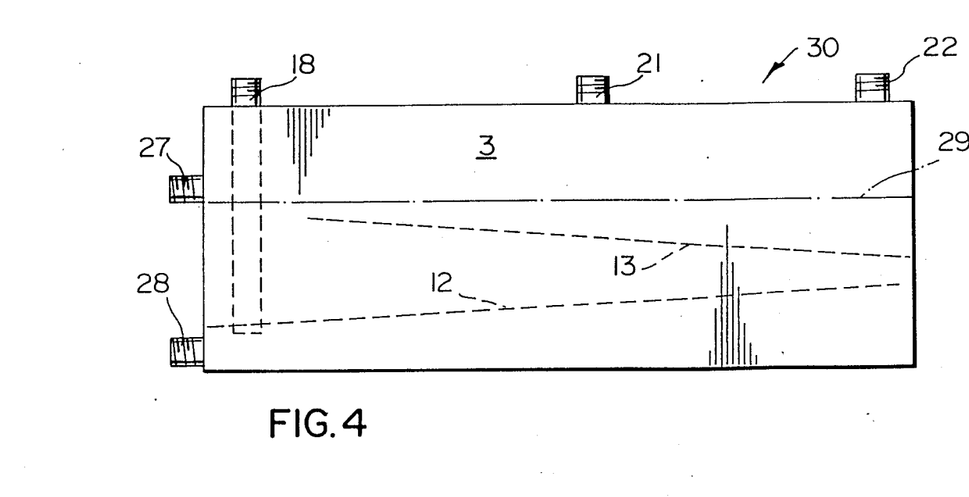
FIG. 4 is a side elevational view of a second embodiment of the apparatus of the present invention.

With reference to FIG. 4, in its simplest form, the apparatus of the present invention includes a rectangular casing generally indicated at 30, the inclined baffles 12 and 13, the gas inlet pipe 18, the vent pipes 21 and 22, the overflow pipe 27 and at least one drain pipe 28.

Another embodiment of the invention (FIG. 5) includes a vertical partition or flow divider 31 extending longitudinally along the bottom center of each baffle 12 and 13. With openings 20 in each side of the gas inlet pipe 18, the flow dividers 31 ensure more uniform distribution of gas bubbles in the treatment liquid 24.

Figure 6:
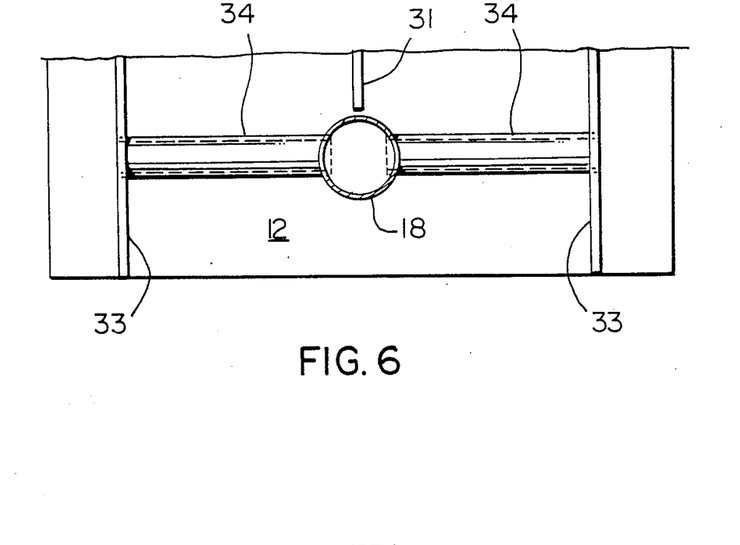
FIG. 6 is a party sectioned, bottom view of one end of a baffle and flow dividers used in the gas inlet end of another embodiment of the invention.
Figure 7:
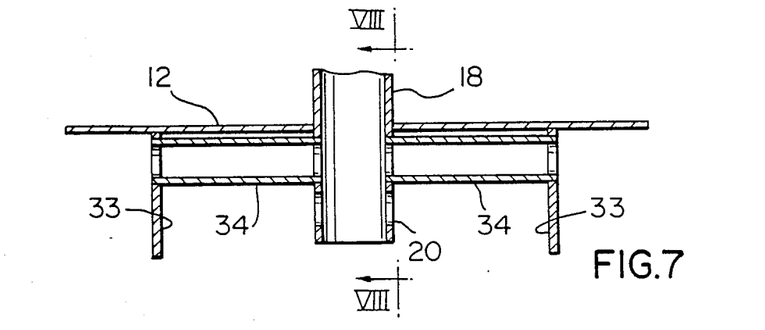
FIG. 7 is a cross-sectional view of the baffle and divider structure of FIG. 6.
Figure 8:
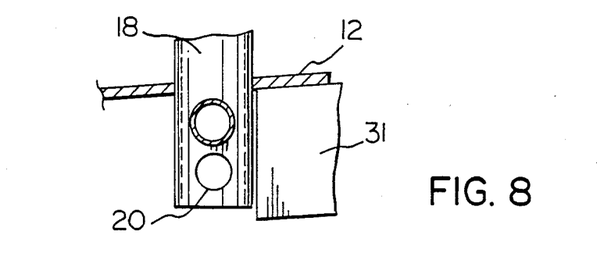
FIG. 8 is a cross section taken generally along line VIII—VIII of FIG. 7.

As best shown in FIGS. 6 to 8, another embodiment of the invention includes additional longitudinally extending flow dividers 33 near the side edges of the baffles 12 and 13 (only 12 shown). In order to ensure that the gas reaches the area outside of the dividers 33, laterally extending discharge tubes 34 extend from top discharge openings 20 through the dividers 33.

Thus, four separate flow paths are created beneath the baffles 12 and 13. It will be appreciated that additional baffles can be provided on the bottom one or both of the baffles 12 and 13.

Figure 9:
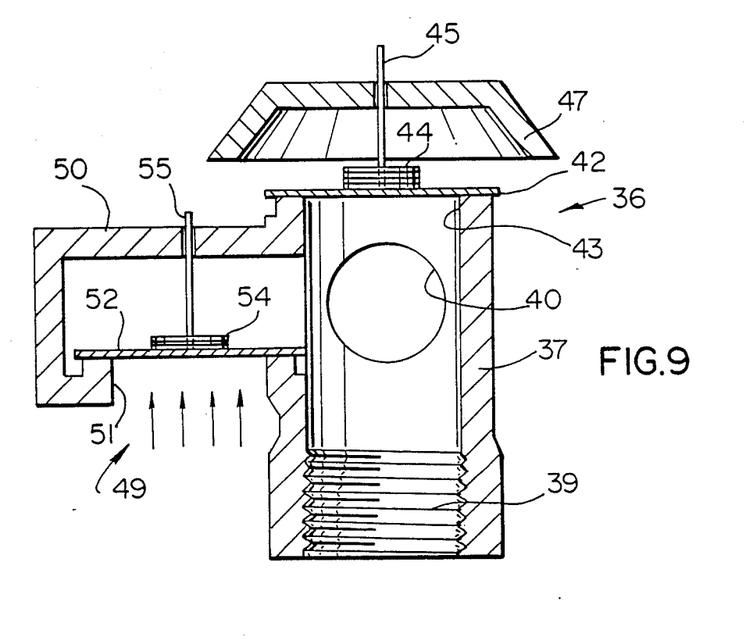
FIG. 9 is a longitudinal sectional view of pressure relief valves for use on the apparatus of FIGS. 1 to 5.

The apparatus described herein is intended for use on storage tanks or trucks having a low burst pressure level. Since the unit may become plugged or frozen, a positive pressure relief valve (FIG. 9) generally indicated at 36 can be provided. The relief valve 36 includes a vertical pipe 37 with an internally threaded bottom end 39 for mounting on the gas inlet pipe 18. Gas is introduced into the pipe 37 through a side inlet 40. A pressure plate 42 is mounted on the open top end 43 of the pipe 37. Weights 44 are removably mounted on a rod 45, so that the relief pressure can readily be changed. The rod 45 is slidable in a protective frustoconical cover 47.

The inlet pressure relief valve 36 should be set to vent incoming vapor if the inlet pressure exceeds, e.g. 1.0 to 5.0 psi (7 to 35 kpa), and should be capable of handling the full flow from the source of inlet gas without creating a back pressure of more than a few psi.

Just as the bursting pressure level may be low, the collapsible of some storage tanks is relatively high, i.e. devices readily collapse when there is an internal pressure drop. Accordingly, a vacuum breaker or negative pressure relief valve 49 (FIG. 9) is also provided. The valve 49 includes a bypass pipe 50 attached to the pipe 37, an opening 51 for admitting air into the inlet line 18. The opening 51 is normally closed by a plate 52, which carries removable weights 54 on a rod 55. The rod 55 is slidable in the pipe 50, so that when the pressure in the casing 1 drops below a predetermined minimum, the valve 49 opens to admit air into the casing.

As will be appreciated, valves 36 and 49 as shown could be replaced by a conventional spring loaded check valve and pressure relief valve.

Figure 10:
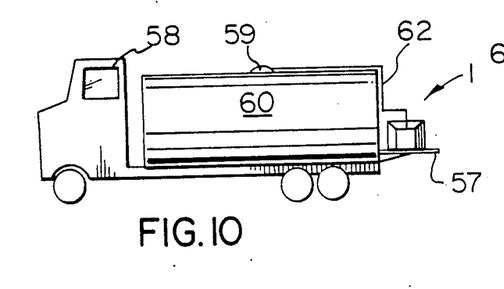
FIG. 10 is a side elevational view of a tank truck equipped with an apparatus in accordance with the present invention.
Figure 11:
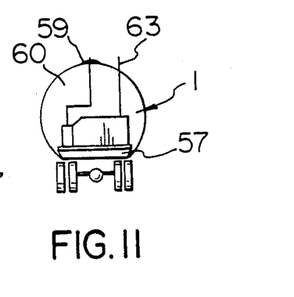
FIG. 11 is a rear end view of the tank truck and apparatus of FIG. 10.
Figure 12:
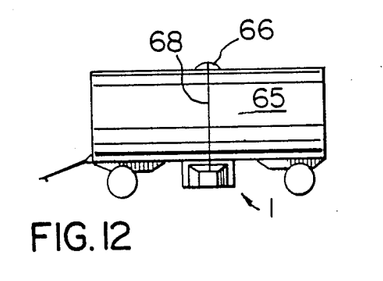
FIG. 12 is a side elevational view of a tank trailer equipped with an apparatus in accordance with the present invention.
Figure 13:
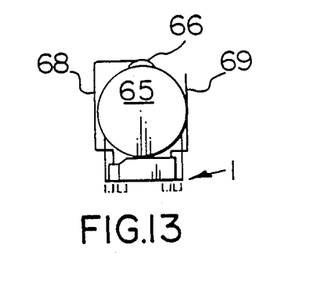
FIG. 13 is a rear end view of the trailer and apparatus of FIG. 12.

FIGS. 10 to 15 illustrate a variety of methods of mounting the apparatus on a tank truck or trailer. As shown in FIGS. 10 and 11, the casing 1 can be mounted on the rear platform 57 of a vehicle 58. The inlet pipe 18 is connected to the hatch 59 of the tank 60 by a line 62. The vent 22 and/or 21 is extended to above the tank 60 by a standpipe 63. Referring to FIGS. 12 and 13, the casing 1 can be mounted centrally beneath the tank 65 of a trailer in much the same manner as a spare tire. As in the case of the truck arrangement of FIGS. 10 and 11, the casing 1 is connected to the hatch 66 of the tank 65 by a line 68, and the casing 1 is vented by a separate line 69.

Figure 14:
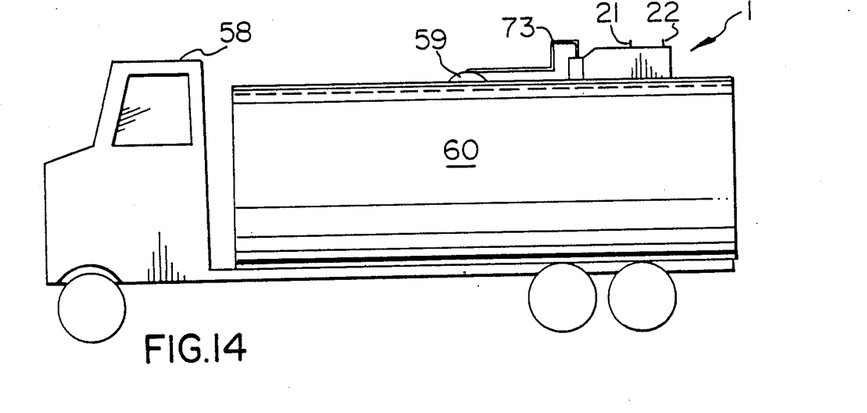
FIG. 14 is a side elevational view of a tank truck carrying a scrubbing apparatus in accordance with the present invention.
Figure 15:
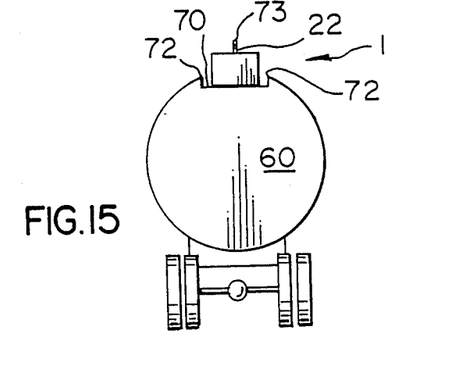
FIG. 15 is a rear end view of the truck and apparatus of FIG. 14.

In the version shown in FIGS. 14 and 15, the casing 1 is mounted in the trough 70 on the top of the tank 60 between the railings 72. The casing 1 is connected to the tank hatch 59 by a line 73, and the casing is vented through vent pipes 21 and 22.

The apparatuses described above are intended for processing small to medium quantities of sour fluid vapors at very low inlet pressures. The $H_2S$ concentration of vapors entering the apparatus may be from a few parts per million (ppm) at which concentration $H_2S$ is considered to be a nuisance gas. Alternatively, the $H_2S$ concentration may be several hundred ppm where the gas becomes a health hazard, or even higher lethal concentrations. The maximum rate of processing vapors will depend on the size and design of the apparatus, but in most cases will be in the range of 10-100 cubic feet per minute (0.3-3.0 $m^3$/min).

The neutralizing liquid used in the apparatus will process large quantities of $H_2S$ before requiring replenishing. Some treatment liquids such as caustic soda solution are spent by sour gas only, i.e. they do not lose scrubbing potency when exposed to the atmosphere. Other relatively volatile liquids such as solutions of ammonia may lose strength when exposed to the atmosphere for extended periods of time.

Referring again to FIGS. 1 to 5, with the drain pipes 28 closed, the apparatus is filled with a scrubbing solution (e.g. ammonium hydroxide, sodium hydroxide or an amine) via the primary vent pipe 22 or the secondary vent pipe 21. Unless a predetermined volume of liquid is used to fill the casing 1, the overflow pipe 27 is left open during filling, so that the casing is filled to the optimum level only.

Depending on the intended use, the properties of the scrubbing solutions determine which solution should be used. Aqueous ammonia is a relatively strong base which can be used to treat large quantities of hydrogen sulfide vapors before losing potency. Major advantages of an ammonia solution include a freezing temperature of $-35°$ C. for a 20% solution ($-80°$ C. for a 30% solution) and manageable reactions products (ammonium sulfite) which does not pose a serious sludging problem. Disadvantages of aqueous ammonia include relatively high volatility, which causes the solution to lose strength over an extended period of time, and objectionable vapors in close proximity to the scrubbing apparatus. Accordingly, aqueous ammonia is more suitable for mobile applications or stationary uses in very cold temperatures.

Caustic soda solution (a solution of sodium hydroxide) is a strong base, which reacts rapidly with hydrogen sulfide. Concentrated solutions such as 50% can neutralize very large quantities of hydrogen sulfide before the pH drops below 10 or 11. The major advantages of a solution of sodium hydroxide are its strength, lack of odor and extremely low volatility, i.e. the strength of the solution is reduced only by reaction with hydrogen sulfide. The disadvantages of a caustic soda solution include a relatively high freezing point and sludging problems with the reaction product. Accordingly, a solution of sodium hydroxide is best used in a building or other heated area where freezing point depression is not required, and where the apparatus can readily be cleaned on a periodic basis. With the casing 1 filled with a scrubbing solution, the source of sour vapors is attached to the inlet pipe 18, and the vapors are permitted to flow into the casing 1. The primary vent pipe 22, and possibly the secondary vent pipe 21 may be attached to riser pipes before being vented to atmosphere. Alternatively, the pipes 21 and 22 can be vented directly to the atmosphere. The outlets 27 and 28 are tightly closed to ensure no leakage of scrubbing liquid or vapor.

As the vapor pressure from the source rises to a relatively low value of, for example 0.2 to 2.0 psi (1.4 to 14 kpa), the liquid level in the inlet pipe 18 moves downwardly to the discharge openings 20. At this point, vapor enters the casing and starts gravity induced movement upwardly beneath the lower baffle 12 to the upper baffle 13, and finally to the area above the treatment solution for discharge through the vent pipes 21 and 22. The discharge openings 20 are located above the bottom end of the pipe 18, so that gas entering the apparatus at low or moderate flow rates is discharged through such openings 20. At low flow rates (less than 1.0 ft$^3$ per minute), the upper set of openings 20 handles all of the flow and directs the gas outwardly several inches from the center of the unit. At moderate flow rates (2-10 ft$^3$ per minute), the gas enters the unit through both sets of inlet openings 20. As the gas flow rate increases, the liquid level in the inlet pipe 18 continues to drop and the pressure in the lower end of the pipe 18 adjacent the openings 20 increases accordingly. Thus, the vapor stream is forced further outwardly towards the side walls 3 of the casing 1. At high gas flow rates, the liquid level in the pipe 18 drops below the bottom end of the pipe, so that gas enters the unit directly from such bottom end of the pipe 18 as well as through the discharge openings 20.

The angles of the baffles 12 and 13 are normally quite small, for example 3.1° for the lower baffle 12, and 4.2° for the upper inclined baffle 13 in the case of a mobile scrubbing apparatus. While the angles are not critical with respect to the basic operation of the scrubbing apparatus, there is a definite range of angles which are practical. A very small angle in combination with high inlet gas flow rates may result in large quantities of gas being trapped beneath the baffle, and consequently poor contact with the liquid scrubbing solution. The chances of small gas bubbles joining to form larger gas bubbles increases as the baffle angle decreases. In the case of a mobile unit, very low baffle angles should be avoided since the tank truck will frequently be parked on an incline of at least a few degrees. Conversely, if the baffle angle is too high, the retention time of the gas in the apparatus will be too low, particularly if the scrubbing solution has a low viscosity as is the case with aqueous ammonia. Insufficient retention time caused by steeply inclined baffles may result in incomplete neutralization of a gas containing a high concentration of hydrogen sulfide. The number and angles of the baffles are also limited by practical considerations of overall height, particularly in the case of a mobile apparatus. It will be appreciated that more than two inclined baffles can be used. However, the baffle angles should be sufficiently low that there is a high retention time, but high enough to avoid the accumulation of gas bubbles at the higher range of expected inlet gas flows. The range of 2-15° should cover most scrubbing applications. Gas rising to the top of the liquid in the casing 1 enters the area between one end of the casing and the first vertical baffle 15. The baffles 15 and 16 act as damping plates for damping any wave action in the treatment of liquid. Such wave action can be generated by the processing of large quantities of gas. As the gas escapes from beneath the upper inclined baffle 13, souring of the treatment liquid is initiated. Of course, movement of mobile units also induces surging. The openings 17 in the plates 15 and 16 are sufficiently large to handle the maximum gas flow rate (approximately twice the total area of the primary vent outlet duct 22), but small enough that waves generated in the treatment liquid do not readily pass through the baffles 15 and 16.

Additionally, but not shown here, the baffles may be provided on the underside with additional projection surfaces which may for example only be in a longitudinal wave-like form. The purpose of which would be to increase the retention of time of the gas in the apparatus.

Thus, there has been described a relatively simple, yet efficient gas scrubbing apparatus, which can be used in a stationary or mobile environment for efficiently cleaning a gas by gas/liquid contact.

While the heretofor description of the subject apparatus has defined the treatment fluid as a liquid, it is within the scope of the invention to utilize a scrubbing agent such as an anhydrous ammonia component in a "gaseous" form. The agent can be injected in a "mist" through or adjacent to drain pipe 28 (FIG. 5). It would be to advantage to provide in such an embodiment a sensing device within for example inlet 18 to sense H$_2$S. A microplassem could be utilized to accept the signal for the sensor and control the amount of scrubbing fluid being injected.

What is claimed is:

1. A portable gas scrubbing apparatus comprising oblong casing means for containing a treatment fluid, inlet duct means in one end of said casing means for introducing gas into the bottom of said one end of said casing means; first inclined baffle means extending between the sides of said casing means from said one end of the casing means to proximate the other end of said casing means; second inclined baffle means above said first inclined baffle means extending between the sides of said casing means from said other end of said casing means to proximate said one end of the casing means, whereby, when gas is introduced into said casing means to said treatment fluid and said baffle means, the baffles define a circuitous path for gas introduced through said inlet means into the treatment fluid beneath said first baffle means at said one end of the casing means to the top surface of the fluid, thereby ensuring good contact between the gas and the treatment fluid; and outlet duct means in the top of said casing means for discharging treated gas from said casing means, wherein said inlet duct means extends into said casing beneath said first baffle means proximate said one end of said casing means for introducing the gas beneath said first baffle means and horizontal tube means connected to said inlet duct means beneath said first baffle means for distributing the gas beneath said first baffle means.

2. An apparatus according to claim 1, including partition means extending between the sides of said casing means from the top of said casing means downwardly to a position above said second baffle means, whereby the bottom of said partition means extends into the treatment fluid when said casing means is filled to dampen wave action on the fluid.

3. A portable gas scrubbing apparatus comprising oblong casing means for containing a treatment fluid; inlet duct means in one end of said casing means for introducing gas into the bottom of said one end of said casing means; first inclined baffle means extending between the sides of said casing means from said one end of the casing means to proximate the other end of said casing means; second inclined baffle means above said first inclined baffle means extending between the sides of said casing means from said other end of said casing means to proximate said one end of the casing means, whereby, when gas is introduced into said casing means to said treatment fluid and said baffle means, the baffles define a circuitous path for gas introduced through said inlet means into the treatment fluid beneath said first baffle means at said one end of the casing means to the top surface of the fluid, thereby ensuring good contact between the gas and the treatment fluid; and outlet duct means in the top of said casing means for discharging treated gas from said casing means, and partition means extending between the sides of said casing means from the top of said casing means downwardly to a position above said second baffle means, whereby the bottom of said partition means extends into the treatment fluid when said casing means is filled to dampen wave action on the fluid, wherein said partition means includes plates with holes therein permitting the passage of gas through the partition means.

4. An apparatus according to claim 3, wherein said outlet duct means includes substantially J-shaped tube means in the top of said casing means, the loop in the tube means defining a trap for preventing the escape of liquid through the outlet duct means.

5. An apparatus according to claim 4, wherein said tube means includes a hole in the bottom of the loop for returning liquid from said outlet duct means to said casing means.

6. An apparatus according to claim 3, wherein said treatment fluid is a liquid.

7. An apparatus according to claim 3, wherein said treatment fluid is a gaseous anhydrous ammonia composition.

8. An apparatus according to claim 3, including vertical flow dividers extending downwardly from said first and second baffle means for dividing the flow of gas into a plurality of streams.

9. An apparatus according to claim 3, wherein said inlet duct means extends into said casing beneath said first baffle means proximate said one end of said casing means for introducing the gas beneath said first baffle means.

10. A portable gas scrubbing apparatus comprising oblong casing means for containing a treatment fluid, inlet duct means in one end of said casing means for introducing gas into the bottom of said one end of said casing means; first inclined baffle means extending between the sides of said casing means from said one end of the casing means to proximate the other end of said casing means; second inclined baffle means above said first inclined baffle means extending between the sides of said casing means from said other end of said casing means to proximate said one end of the casing means, whereby, when gas is introduced into said casing means to said treatment fluid and said baffle means, the baffles define a circuitous path for gas introduced through said inlet means into the treatment fluid beneath said first baffle means at said one end of the casing means to the top surface of the fluid, thereby ensuring good contact between the gas and the treatment fluid; and outlet duct means in the top of said casing means for discharging treated gas from said casing means, including vertical flow dividers extending downwardly from said first and second baffle means for dividing the flow of gas into a plurality of streams and outlet openings in said inlet duct means beneath said first baffle means proximate said one end of said casing means and horizontal tube means extending between said inlet duct means and beneath said first baffle means for distributing the gas beneath said first baffle means.

11. An apparatus according to claim 3, 1 or 10 including gas pressure relief valve means in said inlet duct means outside of said casing means for relieving excess gas pressure in said casing means.

* * * * *